July 26, 1938.  C. B. MOORE  2,125,081
MEASURING AND CONTROL APPARATUS
Original Filed Oct. 4, 1935    4 Sheets—Sheet 1

INVENTOR.
COLEMAN B. MOORE
BY J. E. Hubbell
ATTORNEY

July 26, 1938.　　　　C. B. MOORE　　　　2,125,081
MEASURING AND CONTROL APPARATUS
Original Filed Oct. 4, 1935　　　4 Sheets-Sheet 4

INVENTOR.
COLEMAN B. MOORE
BY J. E. Hubbell
ATTORNEY

Patented July 26, 1938

2,125,081

UNITED STATES PATENT OFFICE 2,125,081

MEASURING AND CONTROL APPARATUS

Coleman B. Moore, Carroll Park, Pa., assignor to The Brown Instrument Company, Philadelphia, Pa., a corporation of Pennsylvania Application October 4, 1935, Serial No. 43,487
Renewed September 7, 1937

37 Claims. (Cl. 236—82)

My present invention comprises improvements in fluid pressure control apparatus operating to create a control fluid pressure force which is impressed on a fluid pressure control motor or analogous control actuating element and which varies in accordance with changes in a control condition such, for example, as a temperature, a pressure, a height of liquid level, or a velocity, the controlling condition usually, thought not necessarily, being returned to, or toward a normal value on a departure therefrom, by the operation of said motor or analogous device.

A main object of the present invention is to provide certain specific improvements in fluid pressure controlling apparatus of the type comprising means whereby a departure in the value of a controlling condition from a predetermined or normal value thereof, varies an air or other elastic fluid pressure control force, and whereby such initial variation in the control force produces a second control force adjustment quickly eliminating more or less of the initial change in the control pressure, and produces a subsequent third control force adjustment by which the effect of the second adjustment is neutralized at a rate suitably retarded to insure the regulation or control stability necessary to avoid hunting. Said second or third adjustments are sometimes referred to as "follow-up" and "compensating" adjustments, respectively, and the third adjustment is also sometimes referred to as an automatic resetting adjustment.

In such control apparatus, the extent to which the initial control pressure adjustment is neutralized by the second adjustment, and the rate at which the third adjustment neutralizes the effect of the second adjustment, should be capable of regulation or calibration to enable the apparatus to give desirable results under varying conditions of operation. In particular, such calibration should be effected with regard to, or in accordance with the maximum magnitude of corrective control actions which the particular process or operation controlled can absorb without being unduly disturbed or upset. Such calibration should also be effected with suitable regard to the time constants or lag of the particular process or operation controlled.

For example, when the control process involves a considerable time lag, such as is experienced in a heating operation conducted with heating apparatus having a considerable heat storage capacity, a period of several minutes, or longer, must ordinarily elapse before the full effect of any given change in the rate of heat supply is realized in the heating effect produced. In general, the time required to effect the above mentioned third adjustment should be greater when the time lag of the controlled process or operation is large, than when it is small. For the best control results, also, the control apparatus should be adjusted with reference to the normal or usually to be expected magnitudes of the changes occurring in the control condition. When those changes are relatively large, the extent to which the second or follow-up adjustment neutralizes the effect of the initial adjustment, ordinarily should be less than when the magnitudes of the changes are smaller.

The importance of suitable control apparatus adjustment or calibration features, is augmented by the fact that the attainment of the optimum practical control results requires a compromise beween that which is required to eliminate or suitably minimize hunting, and that which is required to minimize the magnitude and duration of departures of the controlled condition from a predetermined normal or standard value of the latter, and that which is required to insure a suitably effective response to abnormal conditions of operation which may be expected to occasionally prevail.

Another main object of the present invention is to provide fluid pressure control apparatus of the above mentioned character, which is characterized by its mechanical simplicity and reliability, and by its inclusion of means for readily effecting various adjustments required for optimum control results under a wide range of operating conditions, and the invention comprises various features of construction and arrangement devised and effective to that end.

Specific objects of the invention are to provide apparatus of the character described, which is compact and is itself free from objectionable time lag, and which is not adversely affected by ambient atmosphere temperature changes.

A specific and practically important object of the invention, is to provide a fluid pressure control instrument including control apparatus of the type specified, which is enclosed in a simple compact housing of relatively small bulk and of any convenient or conventional form, and which comprises provisions for easily and accurately effecting adjustments from the front of the instrument, without interference with the control operations of the instrument and without disturbing the latter, other than by the movement of the front cover or door to its open position and the temporary removal or displacement of the instrument record chart, when the instrument is a recording instrument, as is usually desirable. While the present invention is of a special utility in connection with the form of control apparatus mentioned above, some features of the invention are well adapted for use in simpler forms of control apparatus, including apparatus having no provisions for effecting the above mentioned first adjustment, and other apparatus having no provisions for effecting either the second or third adjustments.

The various features of novelty which characterize the present invention are pointed out with particularity in the claims annexed to and forming a part of this specification. For a better understanding of the invention, however, its advantages, and specific objects attained with its use, reference should be had to the accompanying drawings and descriptive matter in which I have illustrated and described a preferred embodiment of the invention.

Figures 1, 1A:
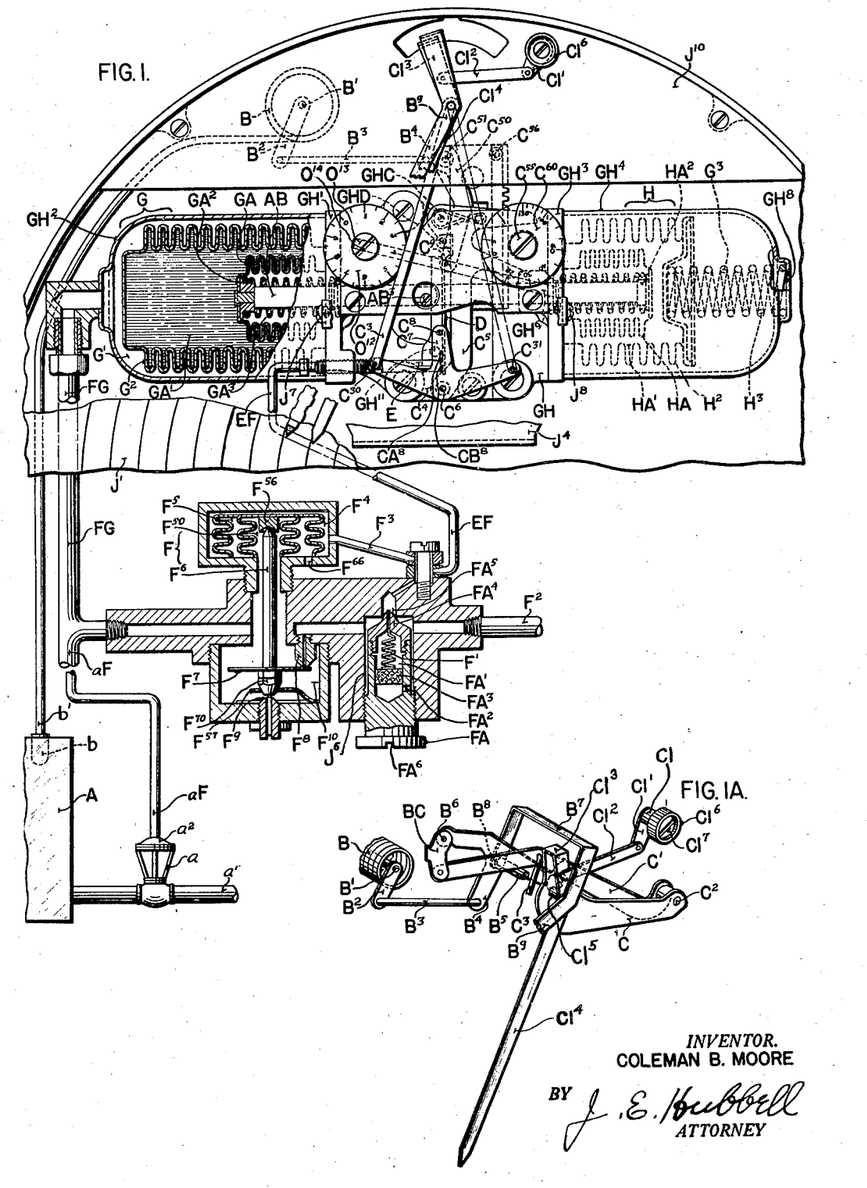
Fig. 1 is a somewhat diagrammatic representation of a control system including apparatus embodying a preferred form of the present invention.
Fig. 1A is a perspective view of a portion of the apparatus shown in Fig. 1.

In the use of the invention diagrammatically illustrated by way of example in Fig. 1, the supply of fuel through a supply pipe $a'$ to a furnace A, is varied by a valve $a$ actuated by a fluid pressure motor $a^2$, in accordance with the pressure variations produced in the pressure chamber $F^{10}$ of a pilot valve mechanism F, which is adjusted to produce such variations by a control instrument J, which measures, and as shown is adapted to record, the temperature in the portion of the furnace A in which the fluid pressure thermometer bulb $b$ is located. The instrument J includes a Bourdon tube or helix B, to the stationary end of of which the pressure in the bulb $b$ is transmitted by a tube $b'$. As the temperature of the bulb increases and decreases, the pressure in the helix B increases and decreases, and thereby gives clockwise or counter-clockwise movements to an arm $B^2$ which is attached to the free end of the helix and is journalled on a shaft $B'$ coaxial with the helix.

Through operating connections, shortly to be described, angular movements of the arm $B^2$ produce corresponding movements of a pen arm $B^9$, which records the varying value of the furnace temperature on a record chart $J'$ continuously rotated in the usual manner by the chart driving shaft $J^2$ of the instrument. Each movement of the arm $B^2$ also gives a corresponding movement to a lever $C'$ and thereby to a valve operating lever $C^4$, and the movement of the latter effects a corresponding initial control force adjustment by changing the relative positions of the port containing element and port throttling element of a control valve. The latter, in the particular form shown, comprises a movable port throttling flapper element D and a stationary port containing nozzle element E having a bleed port $E'$, which is throttled more or less by the flapper D as the latter is moved toward and away from the nozzle E.

The above mentioned second and third adjustments of the pressure in the chamber $F^{10}$, result from adjustments of the flapper D which are not produced by movements of the lever $C'$, but are effected by fluid pressure actuated valve operating means including elements G and H, to the former of which the pressure in the chamber $F^{10}$ is transmitted through the conduit FG. As a result of features of construction and arrangement hereinafter described, the elements G and H are sufficiently compact to permit of their convenient location within the housing for the instrument J, of moderate size and desirable shape, and in the preferred practical embodiment of the invention shown in Fig. 2, the pilot valve mechanism F, and certain associated parts hereinafter referred to, are also mounted in the instrument housing.

Figures 3, 4, 5, 6:
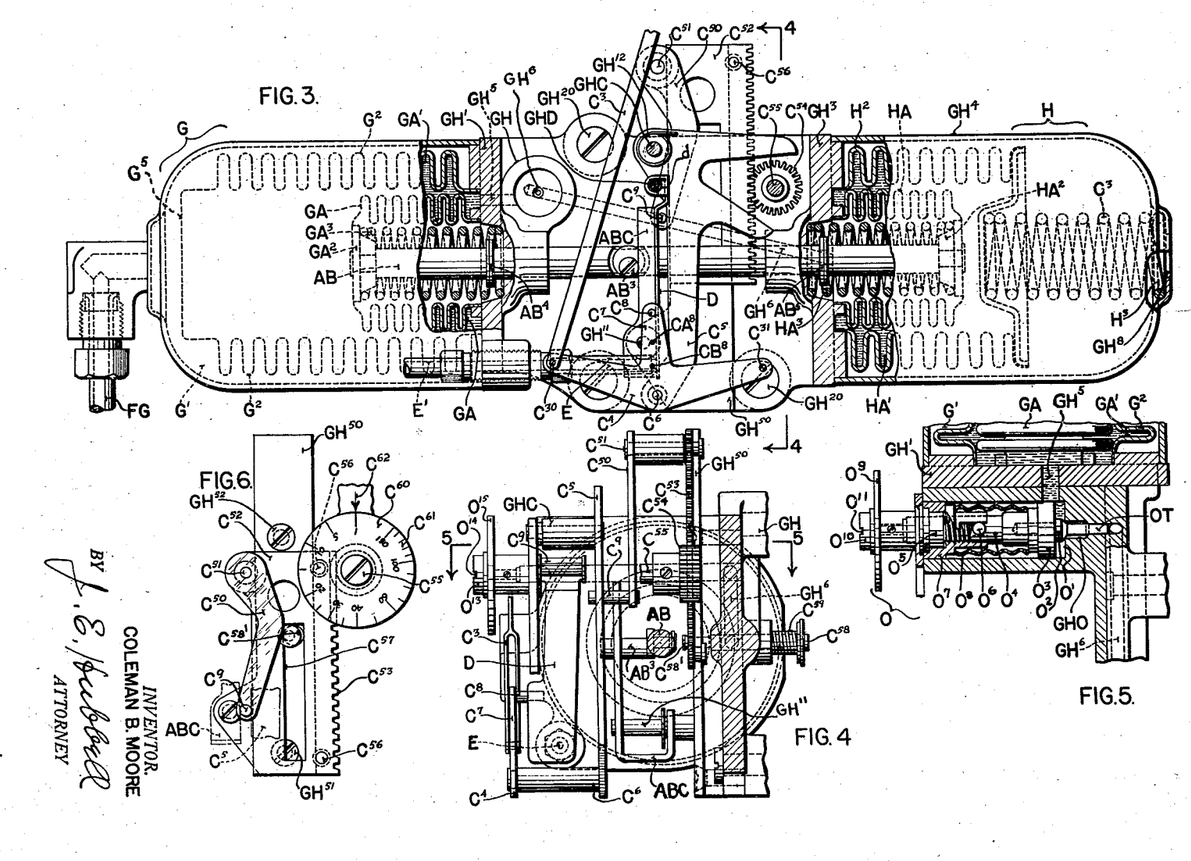
Fig. 3 is an elevation, with parts broken away and in section, of a unitary portion of the control apparatus shown in Fig. 1.
Fig. 4 is a section on the line 4—4 of Fig. 3.
Fig. 5 is a section on the line 5—5 of Fig. 4.
Fig. 6 is an elevation of a portion of the apparatus shown in Fig. 3 with the parts thereof in different relative positions.

The means through which the oscillatory movements of the arm $B^2$ are transmitted to the pen arm $B^9$ and lever $C'$, comprise a bell crank lever $B^4$ having one arm connected by a link $B^3$ to the arm $B^2$. The lever $B^4$ is journalled on a shaft $B^5$ and has a hub portion $B^8$ to which one leg of a yoke member $B^7$ is secured. As shown, the other leg of the yoke member $B^7$ is extended to form the pen arm $B^9$. The movements of the bell crank lever $B^4$ are transmitted to the lever $C'$, by means of a link BC pivoted at one end to another arm of lever $B^4$ and pivoted at the other end to the lever $C'$. The normally stationary, but adjustable fulcrum pivot $C^2$ for the lever $C'$, is carried by a supporting lever C which may be adjusted as hereinafter described. The movements of the lever $C'$ are transmitted through a connecting link $C^3$ to a bell crank lever $C^4$, to one arm of which the lower end of the link $C^3$ is connected at $C^{30}$. The lever $C^4$ is a floating lever, its fulcrum pivot $C^6$ being carried by a lever $C^5$ journalled on a supporting shaft GHC carried by an instrument frame member GH. An arm $C^7$ of the lever $C^4$ carries a pin $C^8$ which, as seen in Figs. 1 and 3, bears against the left hand side of the flapper D, the latter being journalled on a pin GHD carried by the instrument frame part GH. The flapper is lightly biased, as by means of a spring $d$, for movement to the left toward the nozzle E.

The control valve port $E'$ receives air under pressure through a pipe EF from a supply pipe $F^2$, to which the pipe EF is connected through a restricted or throttling orifice $F'$. The port $E'$ bleeds air to the atmosphere, to thereby control the pressure in the pipe EF and associated apparatus, more or less rapidly, accordingly as the flapper D is farther away from, or closer to the end of the nozzle E at which the port or passage $E'$ opens to the atmosphere. In the arrangement shown, on an increase in the temperature of the bulb $b$, the lever $C^4$ is turned clockwise about its fulcrum pivot $C^6$, and the pin $C^8$ turns the flapper away from the nozzle E and thereby increases the flow through the port E' and decreases the pressure in the pipe EF. The throttling effect of the flapper D on flow through the port E' depends not only upon the angular position of the lever $C^4$, but on the angular position of its supporting lever $C^5$, which is angularly adjusted, as hereinafter explained, by the mechanism including the previously mentioned elements G and H.

The pressure in the pipe EF is transmitted through a pipe $F^3$ to the chamber $F^4$ of a pilot valve mechanism F. The latter operates automatically to maintain a pressure in its chamber $F^{10}$ which is proportional to the pressure in the pipe EF. The chambers $F^4$ and $F^{10}$ are separated by a movable wall, comprising a bellows $F^5$ and a bellows $F^{50}$, and the movements of said wall adjust valve means directly controlling the pressure in the chamber $F^{10}$. As shown, the bellows $F^5$ has one end fixed to the pilot housing or casing of the pilot valve and has its other end closed and movable. The bellows $F^{50}$ is smaller than and coaxial with the bellows $F^5$ and within the latter, the bellows $F^{50}$ has one end fixed to the pilot valve housing and has its other end wall connected to the movable end wall of the bellows $F^5$. The bellows $F^5$ is exposed externally to the pressure in the chamber $F^4$, and the bellows $F^{50}$ is exposed internally to the pressure in chamber $F^{10}$. The interbellows space is open to the atmosphere through a port $F^{66}$. A rod $F^6$, formed with a tapered end portion adapted to engage a conical seat formed in abutment $F^{56}$ attached to the bellows end wall and coaxial with the bellows $F^5$ and $F^{50}$, carries at its opposite end a tapered nut $F^{70}$ which serves as a valve member, and also as a clamping nut for securing a valve disc $F^7$ to the rod $F^6$. A spring $F^{67}$ secured to the housing and having an aperture surrounding and bearing on the tapered surface of nut $F^{70}$ tends to lift rod $F^6$ in the apex of the conical seat in member abutment $F^{56}$ whereby any rotary twisting movement of bellows $F^5$ or $F^{50}$ in the operations hereinafter described will not be imparted to the valve rod $F^6$ because the self aligning characteristic of the device will hold rod $F^6$ angularly fixed at the axis of such rotation. The valve disc $F^7$ controls air flow through the inlet port $F^8$ to the chamber $F^{10}$ from the pressure supply pipe $F^2$. The valve member $F^{70}$ controls flow through an outlet port $F^9$ through which air is bled or escapes to the atmosphere from the chamber $F^{10}$.

The pilot valve parts are so arranged that as the pressure in the chamber $F^4$ rises, and the bellows $F^5$ and $F^{50}$ contract, the disc $F^7$ moves away from the adjacent end of the inlet port $F^8$, and the valve member $F^{70}$ moves toward the adjacent end of the outlet port $F^9$. The resultant decreased throttling of the port $F^8$ and increased throttling of the outlet port $F^9$, increases the pressure in the chamber $F^{10}$ in linear proportion to the increase in the pressure in chamber $F^4$. Conversely, on a decrease in the pressure in the chamber $F^4$, the bellows $F^5$ and $F^{50}$ expand, the valve disc $F^7$ exerts an increased throttling effect on the inlet port $F^8$, and the valve member $F^{70}$ exerts a diminished throttling effect on the outlet port $F^9$, and the pressure in the chamber $F^{10}$ is correspondingly reduced. As shown, the full area of the end wall of the bellows $F^5$ is approximately five times the area of the portion of that wall common to the bellows $F^5$ and $F^{50}$. In consequence, the pressure maintained in the chamber $F^{10}$ is approximately five times the pressure in the chamber $F^4$. This excess of the pressure in chamber $F^{10}$ over that in chamber $F^4$ is desirable to provide ample power for actuating the motor valve $a$ and the fluid pressure valve control apparatus including the elements F and G, while at the same time keeping the pressure directly controlled by the movements of the flapper D, desirably low.

From what has already been said, it will be apparent that as the temperature of the bulb $b$ increases, the lever $C^4$ adjusts the flapper D to diminish the pressure transmitted to the pilot valve chamber $F^4$ and thereby proportionally decrease the pressure in the chamber $F^{10}$, which is transmitted through the pipe $aF$ to the fuel valve operating motor $a^2$. The valve $a$ is arranged to decrease and increase the flow of fuel to the furnace through the pipe $a'$, as the control pressure in the chamber $F^{10}$ decreases and increases, respectively. When operating conditions make it desirable to increase and decrease the control pressure in the chamber $F^{10}$ as the bulb temperature respectively increases and decreases, that result may be secured by connecting the lower end of the link $C^3$ to the lever $C^4$ at a point $C^{31}$ which is at the opposite side of the lever fulcrum pivot $C^6$ from the point $C^{30}$.

The element G of the mechanism which adjusts the flapper D by angularly adjusting the lever $C^5$, comprises a shell or casing $GH^2$ located at one side of, and supported by a head $GH^1$ carried by the frame part GH. Within the casing $GH^2$ is a bellows $G^2$ having one end fixed to the head $GH^1$ and having its other end closed by an end wall $G^5$ which is free to move in response to variations in the resultant of the forces acting on the bellows. Those forces include the fluid pressure within the bellows, the control pressure transmitted by the pipe FG to the space $G^1$ enclosed by the casing $GH^2$ and surrounding the bellows $G^2$, and a spring force directly tending to give the bellows $G^2$ a predetermined length. That spring force may be, and as shown is, wholly due to the resiliency of the corrugated wall of the bellows $G^2$. As hereinafter explained, however, the fluid pressure within the bellows $G^2$ includes a component due to the action of a spring $G^3$ which does not, but might be arranged to act directly on the bellows $G^2$.

Within the bellows $G^2$ is mounted a smaller and coaxial bellows GA which has one end attached to the head $GH^1$ and has its other end closed and free to move in response to variations in the resultant of the forces acting on it. Those forces comprise that due to the pressure of an incompressible liquid, as water or a light oil, which fills the space $GA^1$ between the bellows $G^2$ and GA, the pressure of the atmosphere with which the interior of the bellows GA is in free communication, the action of a spring $GA^3$ which opposes the tendency of the bellows GA to contract, and the thrust or pull of a rod AB forming a rigid mechanical connection between the movable closed end $GA^2$ of the bellows GA and the movable closed end $HA^2$ of a bellows HA forming a part of the element H. The spring $GA^3$ acts between the closed end $GA^2$ of the bellows GA and the head $GH^1$. Stops $AB^4$ and $AB^5$ fixed to rod AB determine the maximum movement of the latter by engagement respectively with heads $GH^1$ and $GH^3$.

The element H is generally similar to the element G, comprising a bellows $H^2$ associated with the bellows HA as the bellows $G^2$ is associated with the bellows GA. Each of the last mentioned bellows and the casing $GH^4$ of the element H are secured to a head $GH^3$ which is parallel to, and is located at the opposite side of the lever $C^5$ from, the head $GH^1$ of the element H. The bellows HA and $H^2$ are coaxial with the bellows GA and $G^2$, but the two sets of bellows face in opposite directions, so to speak, so that when the bellows HA and $H^2$ contract or expand, the bellows GA and $G^2$ respectively expand or contract. The bellows $H^2$ is subjected externally to the pressure of the atmosphere, with which the interior of the casing $GH^4$ is in free communication through an opening $GH^8$. The bellows $H^2$ is also subjected to a contracting force by the previously mentioned spring $G^3$ acting between the outer side of the movable end wall of the bellows $H^2$ and the adjacent end of the shell $GH^4$. By the interchangeable use of one or another of springs $G^3$ of different strengths or tensions, the spring action on the bellows $H^2$ may be varied. A spring $HA^3$ acting between the movable closed end $HA^2$ of the bellows HA and the head $GH^3$, opposes the tendency of the bellows HA to contract.

The two interbellows spaces GA' and HA' are in restricted communication through a flow or pressure equalizing connection shown as comprising conduits $GH^5$ and $GH^6$, and an adjustable throttling device O, the adjustment of which determines the character of the third or compensating adjustment, which results from, follows, and neutralizes the control pressure change produced by an initial change in the pressure in the space $G^1$, as hereinafter explained more fully. As shown, the device O comprises a cylindrical valve chamber $O^1$ formed in a portion of the instrument framework. The passage $GH^5$ opens into the chamber $O^1$ adjacent the inner end of the latter through a lateral wall of the chamber. The passage $GH^6$ comprises an end portion GHO opening axially into the chamber $O^1$ through its inner end wall which is formed with a valve seat at the margin of the passage portion GHO toward and away from which the bevelled seat engaging end of a valve member $O^2$ moves as the valve member is adjusted axially in the chamber $O^1$. The movable valve member $O^2$ also comprises a tapered throttling portion OT which cooperates with a passage connecting the passage $GH^6$ with chamber GHO to control the fluid flow between passages $GH^5$ and $GH^6$. The bevelled seat portion acts to prevent jamming of the tapered portion in its working passage by engaging its valve seat before such jamming can occur. Such jamming or "freezing" of the tapered valve portion might otherwise occur as a result of adjustment of the device beyond its intended range. The valve member $O^2$ also includes a piston portion $O^3$ adjacent its inner end which guides the valve member in its movements, a stem portion $O^4$ screwed into a valve operating member $O^5$, and a pin projection $O^6$. The latter works in a longitudinal slot in a tubular part $O^7$ secured in the outer end portion of the valve chamber $O^1$, and in which the operating member $O^5$ is mounted for rotative movement and is held against axial movement. A bellows member $O^8$, secured at one end to the part $O^7$ and secured at its opposite end to the movable valve member $O^2$ adjacent its piston portion $O^3$, prevents leakage from the chamber $O^1$ at the outer end of the latter. A dial member $O^9$ is attached to the outer end of the valve operating member $O^5$ by means of a part $O^{10}$ which is formed with a kerf $O^{11}$ for engagement by a screw driver through which the member $O^5$ may be manually rotated.

The dial member $O^9$ carries a scale $O^{12}$ calibrated in accordance with the law relating to the rate of flow through the throttling device to the adjustment of the latter. The dial scale marking cooperates with an index mark $O^{13}$ on the plate $J^4$ to indicate the rate of return or compensating movement of the rod AB which effects the third or compensating adjustment of the control pressure. The plate $J^4$ is formed with an opening receiving the valve operating part $O^{10}$, and with another opening or dial window $J^5$ through which the portion of the dial scale $O^{12}$ adjacent the index mark $O^{13}$ is visible when not covered by the chart disk $J^1$. The valve part $O^{10}$ and dial window $J^5$ may be rendered accessible for adjustment and inspection, respectively, by merely opening the front cover member $J^3$ and bending the flexible chart $J^1$ forward.

The lever $C^5$ is biased for angular movement about its supporting pivot GHC in the clockwise direction, as seen in the drawings, by a spring $GH^{12}$, and is permitted to turn clockwise under the action of its bias spring, or is moved in the opposite direction against the action of that spring, by the longitudinal movement of the rod AB connecting the movable ends of the bellows GA and HA. The rod AB acts on the lever $C^5$ through an actuating part $AB^3$ carried by the rod AB, and pressure transmitting means comprising a lever ABC and a pin $C^9$, said means being adjustable to vary the leverage with which the rod AB acts on the lever $C^5$. The adjustment of that leverage varies the effect of the second or follow-up adjustment, on the control pressure, and as is hereinafter more fully explained, thereby varies what may be aptly referred to as the throttling range, or extent of throttling movement of the valve $a$ produced by a given departure of the bulb temperature from its normal value.

Preferably, and as shown, the part $AB^3$ carried by the rod AB is a cylindrical pin mounted on the rod AB for angular adjustment about an axis transverse to the length of the rod and laterally displaced from the axis of the pin. The latter is thus in effect an eccentric pin, which by its angular adjustment, varies the relation between the longitudinal position of the rod AB and the angular position of the lever $C^5$. The lever ABC is mounted on a fulcrum pivot $GH''$ carried by the instrument framework, and extending transversely to the rod AB at one side of the latter. The pin $C^9$ is interposed between the right hand edge of the lever ABC and the left hand edge of the lever $C^5$, as the parts appear in Figs. 1 and 3. Each of those edges extends in a direction generally transverse to the rod ABC. The pin $C^9$ is carried by an arm $C^{50}$ depending from a supporting pivot pin $C^{51}$ carried by a plate $C^{52}$ which is mounted for sliding movement in a direction transverse to the length of the rod AB.

As shown, the plate $C^{52}$ is guided in its sliding movement by pins $C^{56}$ which bear against a straight edge formed for the purpose at the right hand side of a framework bar or plate $GH^{50}$, back of the plate $C^{52}$. The pins $C^{56}$ are enlarged at their rear or free ends to form collars which normally engage the back side of the plate $GH^{50}$ and thereby prevent bodily movement of the plate $C^{52}$ away from the plate $GH^{50}$. In normal operation, the pins $C^{56}$ are held in snug engagement with the plate $GH^{50}$ by the engagement of the enlarged beveled head end $C^{58'}$ of a rod $C^{58}$, with the left hand side edge of a slot $C^{57}$ formed in, and extending in the direction of the length of the plate $C^{52}$. The rod $C^{58}$ extends transversely to the chart plane through the slot $C^{57}$, plate $GH^{50}$, and an adjacent portion of the main supporting frame GH, and is urged to the right, as seen in Fig. 4, by a spring $C^{59}$ acting between the end of the rod $C^{58}$ remote from the plate $C^{52}$ and the member GH. By removing one of securing screws $GH^{51}$ of the plate $GH^{50}$ and turning the latter clockwise about the other securing screw $GH^{52}$, the head $C^{58'}$ is permitted to slip into slot $C^{57}$ under the action of spring $C^{59}$, and the plate $C^{52}$ is then permitted the lateral movements required to bring the pins $C^{56}$ into and out of engagement with the edge of the plate $GH^{50}$, in assembling and disassembling the apparatus.

At its right hand edge, as seen in Figs. 3 and 6, the plate is formed with rack teeth which are in mesh with a pinion $C^{54}$ secured to a shaft $C^{55}$ rotatably mounted in the instrument framework. The sliding movement given the plate $C^{52}$ when the shaft $C^{55}$ is rotated, moves the pin $C^9$ toward and away from the fulcrum pivot $GH^{11}$ of the lever ABC, and thereby varies the leverage with which the part AB acts on the lever $C^5$ through the lever ABC and the pin $C^9$. At the front side of the instrument, the shaft $C^{55}$ carries a dial $C^{60}$, having scale marks $C^{61}$ cooperating with a stationary index point $C^{62}$ to indicate the adjustment depending on the position of shaft $C^{55}$. The front end of the shaft $C^{55}$ is formed with a kerf for manual rotation of the shaft by means of a screw driver. The shaft $C^{55}$ extends into an opening formed for the purpose in the plate $J^4$, which is also formed with a dial window opening $J^6$ through which the portion of the dial carrying the scale mark $C^{61}$ in register with the index $C^{62}$ is visible when not covered by the chart $J^1$. In consequence, when the hinged door or front cover $J^3$ of the instrument casing is turned to its open position and the chart $J^1$ is removed or bent forward, the shaft $C^{55}$ is accessible for adjustment and the dial window $J^6$ may be seen.

The plate $J^4$ having the apertures $J^5$ and $J^6$ is secured to the frame GH by means of screws $J^7$ and $J^8$ threaded into the sides of head ends $GH^1$ and $GH^3$ respectively of the member GH. A removable segmental plate $J^9$ which forms a bearing surface for chart $J^1$ ordinarily substantially closes the lower portion of the instrument casing beneath the plane of chart $J^1$ being provided with an opening for the passage therethrough of the chart driving shaft $J^2$, is arranged for edgewise abutment with another segmental plate $J^{10}$ which also forms a chart bearing surface and supports shafts Cl and $Cl^5$. The plate $J^9$ rests on the plate $J^4$ and is provided with a cutout $J^{11}$ adapted to surround the apertures $J^5$ and $J^6$ from which it will be clear that the plates $J^4$, $J^9$ and $J^{10}$ collectively close the instrument casing interior against dust and the like and permit the necessary adjustment of the device O and pin $C^9$ from without the casing.

The adjustment effected by a change in the position of the pin $C^9$ may be conveniently and aptly designated a "throttling range" adjustment. The term "throttling range" as here used, may be defined as the percentage of the total operating range of deflection of the instrument pen arm $B^9$, or analogous measuring element, required for adjustment of the control valve $a$ between the wide open and fully closed positions of the latter. Thus, if the full scale deflection of the pen arm is required for the adjustment of the valve $a$ between its fully closed and wide open positions, the apparatus has a throttling range of 100%, and if the valve $a$ will be moved between its fully closed and wide open positions by a pen arm deflection which is a tenth of the full scale deflection of the pen arm, the throttling range is 10%, and if the apparatus is so adjusted that full scale deflection of the pen arm is insufficient for the adjustment of the valve $a$ between its wide open and fully closed positions, the throttling range of the apparatus will be more than 100%. For example, if when the pen arm is at one end of the scale range, the valve $a$ will pass one sixth of the maximum or wide open flow through the valve, and will pass five sixths of the maximum flow when the pen arm is at the other end of the scale range, as is practically desirable in some cases, the throttling range of the apparatus is 150%. Advantageously, and as shown, the scale marking $C^{61}$ on the dial $C^{60}$ is graduated in throttling range percentage units. In the position of the parts shown in Fig. 6, the throttling range of the apparatus is 1%. With the parts in the position shown in Fig. 3, the throttling range is 150%, which is the maximum range for the particular apparatus proportions and arrangement shown in Figs. 1, 2, and 3.

The throttling range adjustment may be extended if desirable in the apparatus illustrated by removing the pin $C^8$ from its illustrated position on the arm $C^7$ of lever $C^4$ and inserting the pin into another threaded hole $CA^8$ or $CB^8$ as provided. With pin $C^8$ in hole $CA^8$ for example a throttling range adjustment of from 0–300% may be obtained and with pin $C^9$ in hole $CB^8$ a still greater range of throttling adjustment of from 0–600% is attainable.

In considering the throttling range of the apparatus shown in Fig. 1, it should be borne in mind that the net effect of the first and follow-up adjustments following any particular definite departure of the pen arm from its predetermined normal value position, is a corresponding definite change in the control pressure, and a corresponding definite change in the flow capacity or throttling effect of the valve $a$. In practice, the latter is desirably of a known type in which the change in its flow capacity produced by a change in the control pressure, is in linear proportion to the last mentioned change.

At this point, attention is directed to the fact that in the operation of the apparatus of the form shown in Fig. 1, the second or follow-up adjustment provisions may serve two quite different purposes. Thus, when the apparatus is so calibrated that the follow-up adjustment lags appreciably behind the control pressure change producing it, the initial control pressure change may be appreciably greater than the ultimate change produced by the first and second adjustments. The initial over-adjustment tends to a quick check of the departure of the controlling condition from its normal value, which is highly advantageous in some cases. Secondly, whether the second adjustment lags appreciably behind, or is practically contemporaneous with the initial adjustment, the second adjustment insures that the net effect of the first and second adjustments will not be to turn the flapper valve into a particular spatial position, but to position it in the particular position required for the desired change in the control pressure. As will be apparent, for the attainment of a particular control pressure, the flapper D must be closer to, or farther away from the nozzle E, accordingly, as the supply pressure in the pipe F² is relatively low or relatively high. The second or follow-up adjustment makes the operation of the control apparatus substantially independent of ordinary variations in the control pressure, and also compensates for the tendency of other factors, such as a dirt deposit partial obstruction of the nozzle E, to require slightly different positions of the flapper D for the maintenance of some one particular pressure.

With the form of apparatus shown in Fig. 1, the control effected solely as a result of the initial and follow-up adjustments, is controlled with a "drooping characteristic", i. e., a control in which a departure of the pen arm from its normal value position, resulting, for example, from an increase in the furnace load, will establish a control force minimizing the extent of pen departure produced by the load change, but not tending to fully return the pen arm to its normal position. In other words, furnace control regulation with a drooping characteristic, tends to the maintenance of higher furnace temperatures with light furnace loads than with heavier furnace loads. Regulation with a drooping characteristic is not peculiar to furnace control, but may be had in regulating any automatic process or operation, and is of itself ordinarily desirable, because it tends to regulation stability and the avoidance of hunting.

When as a result of a change in furnace load or analogous condition, regulation with a drooping characteristic results in a significant departure of a controlling condition from its normal value, that value may ordinarily be restored by some manual adjustment of the control apparatus. For example, with the form of apparatus shown in Fig. 1, such restoration may be effected by adjustment of the control setting point adjustment part Cl⁶, or by adjustment of the eccentric pin AB³. In the form of apparatus shown in Fig. 1, however, such manual adjustments to restore the normal value of the controlling condition on departures therefrom resulting from ordinary furnace load changes, are made unnecessary by the automatic compensating provisions which operate in effect to reset the control apparatus to a new relation of the pen arm and control valve.

The particular throttling range and the particular rate of the compensating or automatic resetting action which will give optimum control results vary with conditions. In general, however, when the lag in the controlled process or operation is relatively large, and abrupt variations in the value of the controlling conditions is especially objectionable, the throttling range should be relatively great, and when long periods of departure of the controlling condition from its normal value is especially undesirable, the throttling range should be relatively narrow and the throttling range may advantageously be made narrower when the process or operation controlled permits large corrections in the controlled quantity without unbalancing or upsetting the process or operation than when the latter is upset or unabalanced unless the corrections are relatively small. In general, also, the conditions which make a wide throttling range desirable or undesirable, make desirable a relatively slow or a relatively rapid automatic resetting or compensating adjustment, respectively. It may also be said that ordinarily, the time required for effecting the automatic resetting or compensating adjustment should increase or decrease in accordance with the rate at which changes in the controlled process or operation occur.

The position which the flapper D will occupy with any particular angular adjustment of the pen arm B⁹ and lever C⁵, may be varied as previously stated, by adjustment of the pivot C² for the lever C'. As will be apparent, the same effect on the angular position of the lever C⁴ may be produced by raising or lowering either end of the lever C', while the other end of the lever remains stationary. The end of the lever C' connected to the pivot C² may be raised or lowered by angular adjustment of the lever C about its supporting shaft Cl⁵ which, as shown, is coaxial with the pen arm supporting shaft B⁵. The lever C may be so adjusted by manual angular adjustment of a shaft Cl mounted in the instrument framework and frictionally held in any angular position into which it is adjusted. The shaft Cl carries a crank arm Cl' connected by a link Cl² to a yoke extension Cl³ of the lever C, one leg of that extension being prolonged to form an index Cl⁴ which indicates the control point setting on the scale chart J'. When the actual value of the controlling condition corresponds to the normal value determined by the control point setting, the ends of the index Cl⁴ and pen arm B⁹ are at the same distance from the axis of the chart rotating shaft J².

Figures 2, 2B:
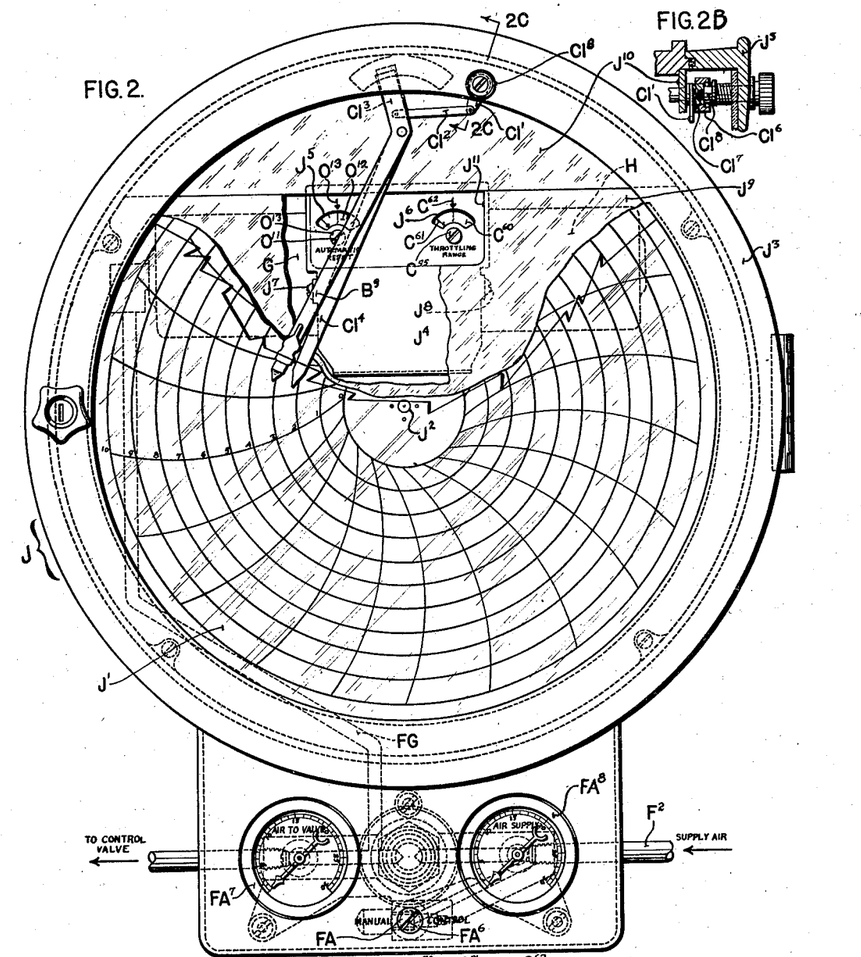
Fig. 2 is an elevation with parts broken away, of a control instrument including control apparatus shown in Fig. 1.
Fig. 2B is a partial section on the line 2B—2B of Fig. 2.

At its end exposed at the front of the instrument shown in Fig. 2 when the cover member J³ is moved to its open position, the shaft Cl is provided with a knurled head or knob Cl⁶ (see Fig. 2B), to permit of manual angular adjustment of the shaft Cl with the cover member J³ in its open position. The shaft head is formed with a kerf Cl⁷, entered, when the cover is in its closed position, by the flattened end portion of a shaft Cl⁸ journalled in and extending through the marginal portion of the cover J³, and in axial alignment with the shaft Cl when the cover is closed, and having a knurled head at its outer end, and a kerf therein for screw driver engagement, for manual adjustment of the shafts Cl and Cl⁸ with the cover J³ in its closed position.

In considering the operation of the apparatus shown in Fig. 1, insofar as it has now been described in detail, it is convenient to consider the control operation cycle initiated by a decrease in the temperature of the bulb b following a period of stable operation in which the bulb temperature is at a predetermined normal value, and the control pressure in space G' is constant and has been for a time long enough for the liquid pressures in the interbellows spaces GA' and HA' to equalize, as hereinafter explained, and for the bellows GA and HA, to assume their normal unstretched lengths. Under the conditions assumed, when the furnace temperature decreases, the lever C⁴ is given a counterclockwise adjustment about its fulcrum pin C⁶, and thereby moves the flapper D toward the nozzle E and increases the control pressure in the chamber F¹⁰, and thereby actuates the motor a² to adjust the valve a to increase the fuel flow to the furnace.

The increase in the control pressure transmitted to the chamber G' by the pipe FG, produces an immediate contraction of the bellows G² and GA, the latter moving as required to maintain the previously existing volume of the liquid filled interbellows space GA', since this initial bellows movement is effected rapidly, and in a period of time too short for the flow of a significant amount of liquid from the space GA' through the throttling device O into the inter-bellows space HA', although said bellows contraction necessarily increases the pressure of the liquid in the space GA' and initiates said flow.

The contraction of the bellows GA produces a corresponding expansion of the bellows HA and $H^2$ through the connecting rod AB. The pressure of the atmosphere on the bellows $H^2$ remains constant, regardless of the length of that bellows, but the expansion of the bellows HA and $H^2$ increases the fluid pressure in the space HA' as a result of the spring action opposing the expansion of the bellows $H^2$. That spring action is the resultant of a component due to the resiliency of the corrugated wall of the bellows $H^2$, and a component due to the spring $G^3$, the tension of which increases with the extent of the expansion of the bellows $H^2$. So far as the initial effect of the pressure increase in G' is concerned, the increase in fluid pressure in the space HA' is significant only because it acts through the bellows HA, rod AB, and bellows GA, to correspondingly increase the pressure of the liquid in the space GA' and thereby subjects the bellows $G^2$ to a force opposing the contraction of the latter. In effect, the spring action which directly opposes the expansion of the bellows $H^2$ is thus transmitted to the bellows $G^2$, with the result of reducing the extent of contraction of the bellows $G^2$ required for the development of forces opposing and balancing the effect on the bellows $G^2$ of the increased pressure in G', exactly as if that spring action were wholly due to the resiliency of the corrugated wall of the bellows $G^2$, or were partly due to that resiliency and partly due to the action of an independent spring acting directly on the bellows $G^2$ to oppose its contraction.

The fluid pressure in the space GA' is also increased on the contraction of the bellows GA, by the resiliency of the bellows GA, and by the action of the spring $GA^3$ which has its tension increased by the contraction of the bellows GA. It is to be noted, however, that the elongation of the spring $HA^3$, and the consequent reduction in the tension of that spring, as the bellows HA elongates, may partially neutralize the effect on the bellows GA of the increase in tension of the spring $GA^3$.

The movement of the rod AB produced by the contraction of the bellows GA, operates through the pin $AB^3$, lever ABC, and pin $C^9$ to turn the lever $C^5$ counter-clockwise against the action of its bias spring $GH^{12}$, and thereby bodily shift the lever $C^4$, including its flapper engaging pin $C^8$, to the right, as seen in Figs. 1 and 2. The last mentioned movement of the pin $C^8$, moves the flapper D away from the nozzle E, with the result of effecting the second or follow up adjustment decrease in the pressures in the pilot valve chambers $F^4$ and $F^{10}$ and in the space G'.

The extent to which the initial increase in the control pressure, effected by the angular adjustment of the lever $C^4$, is thus neutralized by the second or follow-up adjustment of the control pressure resulting from the clockwise angular movement of the lever $C^5$, depends both on the extent of the movement of the connecting rod AB, and upon the leverage with which the pins $AB^3$ and $C^9$ interact through the lever ABC, and that movement and leverage are each susceptible of regulation as has been explained. Since the second or follow-up adjustment is initiated as soon as the pressure in the chamber G' begins to increase, the initial and follow-up adjustments of the flapper D may be contemporaneous in part, but whether the initial adjustment is completed before or during the time in which the follow-up adjustment is being effected, the ultimate effect of a given decrease in the temperature bulb $b$ is a quickly effected adjustment of the flapper D into a position intermediate of its former position and the position which it would have if the movement given pin $C^8$ by the angular adjustment of the lever $C^4$ were not partially neutralized by the angular follow-up adjustment of the lever $C^5$.

As soon as the pressure of the inter-bellows space GA' is increased as a result of the pressure increase in G', liquid begins to flow from the space $GA^1$ into the space $HA^1$. Ordinarily, as previously explained, that flow is too slow to have any significant effect on the pressure in the space $GA^1$ during the period required for the completion of the initial and follow-up adjustments. Eventually, however, assuming no further bulb temperature change in the meantime, enough liquid will flow from the space $GA^1$ into the space $HA^1$ to equalize the pressures in the two spaces and to permit the bellows GA to expand and the bellows HA to contract to their normal lengths. The time required for pressure equalization depends in part upon the extent of the initial contraction of the bellows GA, and in part on the throttling effect of the device O, which may be adjusted as has been explained.

As the bellows GA and HA slowly return to their normal lengths, the rod AB is moved slowly to the left, thereby returning the pin $AB^3$, pin $C^9$, and lever $C^5$ to their normal or stable operation positions. This slowly effected return movement of the lever $C^5$ gives the flapper D its third or compensating adjustment and neutralizes the effect of the second or follow-up adjustment on the flapper position. Bellows $G^2$ at the termination of the compensating action, will be displaced from its initial position by an amount depending upon the amount of liquid which is transferred from the space $GA^1$ to the space $HA^1$ during the interval that the temperature at bulb $b$ was below its normal value. At this time, assuming that the effect of the increased pressure in space $G^1$ has caused sufficient opening of valve $a$, that the temperature has returned toward its normal value, equilibrium of the apparatus, with bellows HA and GA at their normal lengths, may occur with a pressure in space $G^1$ different from the pressure at the space at the commencement of the operations just described.

For steady operation with varying rates of heat output, it is theoretically necessary that the flapper D should occupy a different position for each different heat output rate. In consequence, if the furnace load during and at the end of the assumed operating cycle was more than it was just prior to the beginning of the cycle, the control pressure must be higher at the end of the cycle than it was immediately prior to the beginning of the cycle, and at the end of the cycle the temperature of the bulb $b$ must be below its former and assumed normal value. In practice, however, with the control apparatus of the type illustrated which is properly designed and calibrated for the conditions of operation, the difference between the stable furnace temperatures obtained with different loads in any ordinary range of load variation, will be too slight to have measurable or other practical significance. Moreover, where the furnace loads have widely different average values during different periods, if of an appreciable duration, the theoretical tendency of the different average loads to result in different bulb temperatures, may be eliminated by suitable adjustments of the device as hereinafter described.

It hardly needs to be pointed out that in an operating cycle initiated by an incrase in the temperature of the bulb $b$, control actions are effected which are precisely analogous, though respectively opposite in direction to, the above described actions occurring in a cycle initiated by a decrease in the bulb temperature.

Figure 2A:
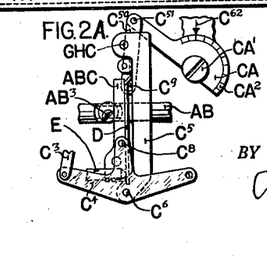
Fig. 2A is a view of a modification of a portion of the apparatus shown in Fig. 1.

A modification of the throttling range adjustment provisions is shown in Fig. 2A. In that figure the sliding plate $C^{52}$ is dispensed with, and the arm $C^{50}$ is pivotally connected at $C^{51}$ to a crank arm extension of a rotatable dial carrying member CA. The latter is pivoted on a headed shaft $CA^1$, and its dial scale marking $CA^2$ acts in conjunction with a stationary index $C^{62}$ to provide a measure of the changes in throttling range produced by the rotation of the member CA.

Occasionally in controlling a process or operation which is automatically controlled under ordinary conditions, some special condition may make manual control temporarily desirable. Heretofore in such cases, the change from automatic control to manual control has involved disturbance of control apparatus adjustments previously found desirable and desirably employed when automatic control is reestablished. In the control apparatus shown in Fig. 1, I have included means for changing from automatic control to hand control and back to automatic control quickly and easily and without changing any adjustment of the control apparatus except the adjustment of the control point setting member Cl, which may be easily, quickly, and accurately readjusted when automatic control is resumed.

For manual control in accordance with the present invention, I have provided a manually adjustable valve member FA, which is closed in the automatic control condition of the apparatus, and when opened for manual control, establishes a regulable by-pass about the restricted flow passage F' through which, in automatic control, air passes from the supply pipe $F^2$ to the conduits EF and $F^3$. The flow capacity of said by-pass is sufficient to permit of the maintenance of the required pressure in the pilot valve chamber $F^4$, notwithstanding that the flapper D is then moved, by adjustment of the control setting member Cl, so far away from the nozzle E, as to have no effect on the flow through the latter, regardless of the flapper adjustments which may then be effected by movements of the levers $C^4$ and $C^5$. While the flow passage through the nozzle E is relatively unrestricted in comparison with the flow passage F', it is sufficiently restricted in comparison with the flow capacity of said by-pass to permit as great, or even greater, throttling range adjustment of the pressure in the chamber $F^4$, as is obtainable in automatic control by the movements then given the flapper D.

In the preferred instrument form shown in Fig. 2, the valve member FA, shown diagrammatically in Fig. 1 is in the form of a plunger threaded into an outer portion of a chamber $J^6$ formed in a portion of the instrument housing or casing, and in open communication at its inner end with the passage in said housing portion through which the supply pipe $F^2$ communicates with the pilot valve passage $F^8$ and with the pipes EF and $F^3$. The path of flow to said pipes includes a passage portion $FA^5$ coaxial with, and opening into the chamber $J^6$ at the inner end of the latter. The wall of the passage $FA^5$ provides a seat for the conical seat engaging end portion $FA^4$ of the valve member FA. The above mentioned by-pass is established by moving the valve member FA out of its seat engaging position.

When the valve member FA is in its seat engaging position, the pipe $F^2$ is connected to the pipes EF and $F^3$ only through the restricted passage F'. The latter is formed as shown, by a coiled capillary tube located in a chamber FA' formed in the valve member FA, and having an axial outlet end portion opening into the passage portion $FA^4$ through the valve forming portion of the end wall of the chamber FA'. Air passes from the supply pipe $F^2$ to the chamber FA' through the annular space between the inner wall of the chamber $J^6$ and the outer end portion of the valve member FA, which is of smaller diameter than the chamber $J^6$, and through a port $FA^2$ opening to the chamber FA' from said annular space. A filter $FA^3$ of felt or the like is interposed in the chamber FA' between the inlet end of the passage F' and the port $FA^2$. The pressure gauge $FA^7$ shown as Fig. 2, gives a measure of the control pressure in the chamber $F^{10}$ of the pilot valve, which is especially desirable when the apparatus is under hand control. The pressure gauge $FA^8$ shown in Fig. 2, indicates the pressure at which air is supplied by the pipe $F^2$. Notwithstanding the fact that the valve member FA includes a chamber containing the capillary tube providing the passage F', and the filter $FA^3$, the valve mechanism is so compact that it, as well as the pilot valve mechanism F and the passages directly associated therewith, and also the gauges $FA^7$ and $FA^8$, are conveniently formed or mounted in a relatively small extension from the cylindrical housing body portion, which is of no greater diameter than is required for a record chart of convenient size.

As previously stated, some of the features of the present invention are adapted for use in control instruments simpler than the type of instrument illustrated in Fig. 1 in that they do not include some or all of the mechanism required to obtain the second or follow up, and the compensating adjustments obtainable with the apparatus shown in Fig. 1. Thus, for example, in Fig. 7 I have diagrammatically illustrated essential features of a commercial form of control instrument having the same capacity for throttling range adjustment as the instrument shown in Fig. 1, but lacking the automatic compensating adjustment or resetting feature of Fig. 1. The instrument shown in Fig. 7 is adapted for mounting in the same instrument casing as is shown in Fig. 2, and may comprise parts identical with all those shown in Fig. 1, except for certain parts through which the lever $C^5$ is actuated to adjust the flapper D.

Figure 7:
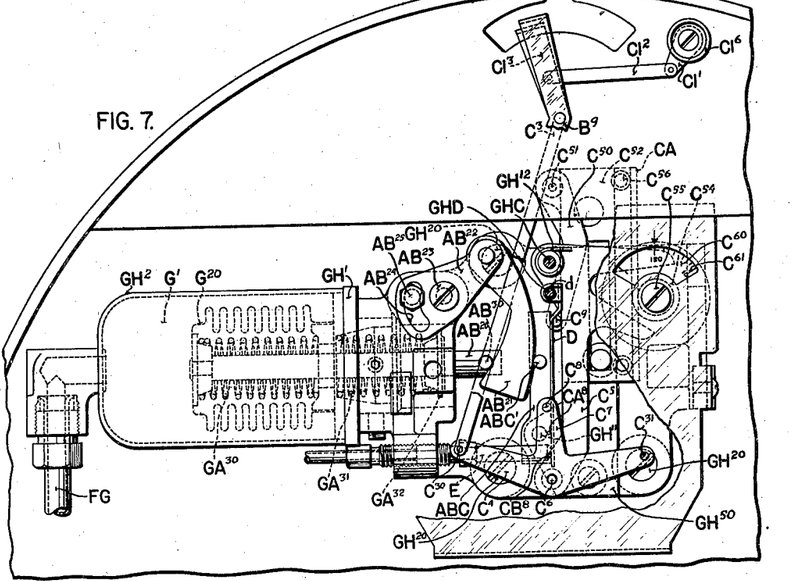
Fig. 7 is a diagrammatic elevation, partly in section, of a portion of control apparatus differing from that shown in Fig. 1.

The apparatus shown in Fig. 7 comprises no parts directly corresponding to the bellows elements GA, HA, and $H^2$, of Fig. 1, but does include a bellows element $G^{20}$, forming the movable wall of a pressure chamber G' surrounded by the casing $GH^2$ and to which the control pressure may be transmitted from the pilot valve mechanism by a pipe FG, as in Fig. 1. The bellows $G^{20}$ is subjected internally to the pressure of the atmosphere, and acts on the lever $C^5$ through one end of a thrust rod $AB^{20}$, which has its other end rigidly connected to the movable end wall of the bellows $G^{20}$. The thrust rod $AB^{20}$ acts on the lever $C^5$ through a lever ABC and pin $C^9$. The latter might be adjusted along the length of the edge of the lever $C^5$ by the means for the purpose shown in Fig. 2A, but in the form shown in Fig. 7, the pin $C^9$ is supported and adjusted by an adjusting device CA such as is shown in Fig. 1. The thrust rod $AB^{20}$ acts on the lever ABC through a thrust block $AB^{21}$ of wedge shape which is pivotally connected to, and suspended from a crank arm $AB^{22}$ carried by a manually rotatable member $AB^{23}$ and forms a thrust member between pin $AB^{30}$, corresponding to the pin $AB^3$ of Figs. 1-6, and pin $ABC^1$ of the lever ABC. The shaft $AB^{23}$ is mounted in the instrument framework for adjustment from the front of the instrument. A portion of the crank $AB^{22}$ is provided with a slot $AB^{24}$ which engages pin $AB^{25}$, the latter of which is provided with a head engaging the member $AB^{22}$ providing a guiding means, preventing tilting movement of the part $AB^{22}$ when the latter is rotated by means of member $AB^{23}$.

In the normal contemplated operation of the apparatus shown in Fig. 7, the pressure in the space $G^1$ is controlled by the flapper D, and depends jointly upon the value of the controlling condition, which determines the angular adjustment of the lever $C^4$ about its fulcrum pivot $C^6$, and upon the length of the bellows $G^{20}$. The length of that bellows at any time, depends upon the then existing control pressure in the space $G^1$. On a change in that pressure, the bellows moves until the effect of that pressure change on the external surface of the bellows $G^{20}$ is balanced by opposing forces due partly to the pressure of the atmosphere acting on the inner side of the bellows and partly to the spring action which, disregarding the relatively insignificant action of the bias spring $GH^{12}$ for the lever $C^5$, is due to the resiliency of the corrugated wall of the bellows $G^{20}$ and to the action of a pair of springs $GA^{30}$ and $GA^{31}$, the former acting between the stationary end wall $GH^1$ and the movable end wall of the bellows $G^{20}$, and the latter acting between the stationary end wall $GH^1$ and abutment $GA^{32}$ fixed to the rod $AB^{20}$. The effect of that resiliency may be supplemented, when necessary or desirable by the action of an independent spring, analogous to the spring $G^3$ of the construction first described. In any event, the bellows $G^{20}$ is subjected to a spring action opposing a departure of its length from a normal unstressed bellows length, and reestablishing that length when the pressure in the chamber $G'$ is equal to the pressure of the atmosphere.

As will be apparent without further explanation, the apparatus shown in Fig. 7 is adapted to effect a second or follow-up adjustment after each control pressure adjustment due to angular adjustment of the lever $C^4$, exactly like that obtained with the apparatus shown in Fig. 1. The apparatus of Fig. 7, however, is incapable of effecting the third compensating, or automatic resetting adjustment obtained with the apparatus of Fig. 1. However, on a load change continuing for an appreciable period, and hence tending to the continuous maintenance of a controlling condition value different from the desired normal value, the latter may be reestablished readily by a corresponding vertical adjustment of the wedge shaped thrust block $AB^{21}$. The latter forms a convenient and effective device for the relatively wide range of adjustment required for manual resetting purposes. It is also adapted to serve the adjustment purposes of the eccentric pin $AB^3$ of the arrangement first described. The manual resetting effect may also be secured by adjustment of a control point setting device such as the shaft CL of the apparatus first described, but the arrangement shown in Fig. 7 has the advantage of permitting the setting point index to be positioned at the desired normal value of the controlling condition, and the block $AB^{21}$ and its adjusting means are better adapted for the desired range of manual resetting adjustment, than is the control point setting means.

Figure 8:
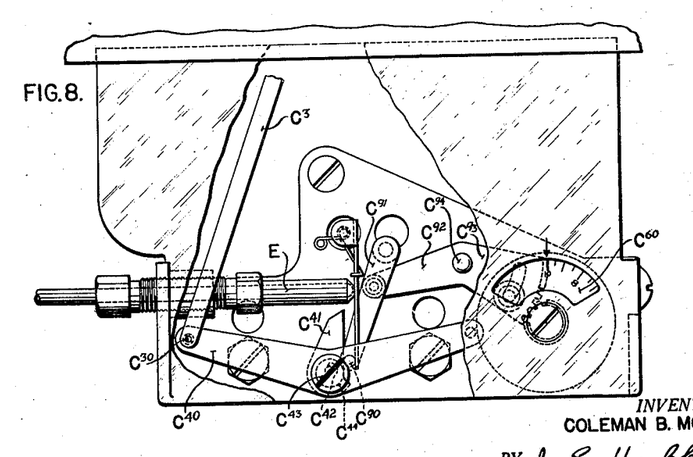
Fig. 8 is an elevation of control apparatus differing in some respects from that shown in Figs. 1 and 7.

Features of the present invention are used in the apparatus illustrated in Fig. 8 in which the position of the flapper D depends wholly upon the position of the control condition responsive means through which the link $C^3$ is adjusted as in the apparatus shown in Fig. 1. In Fig. 8, the link $C^3$ is connected at its lower end to a bell crank lever $C^{40}$, pivoted at $C^{44}$, which has an arm $C^{41}$ acting on the flapper D through a pin $C^{90}$. The latter may be adjusted along the lengths of the flapper and arm $C^{41}$ by any of the mechanisms previously described for adjusting the pin $C^9$ along the length of the lever $C^5$, but as shown in Fig. 8, the pin $C^{90}$ is carried by an arm $C^{91}$ pivotally supported by an arm $C^{92}$ from a gear segment $C^{93}$. The latter is adapted for angular adjustment about a stationary supporting pivot $C^{94}$ by the rotation of a spur gear connected to, and rotating with a dial member $C^{60}$ similar in form, mounting, and purpose, to the dial member $C^{60}$ shown in Fig. 6. It is to be noted, however, that with the form of apparatus shown in Fig. 8, it is ordinarily impractical to provide mechanical provisions for adjusting the flapper through a throttling range of more than 10% or thereabouts. The apparatus shown in Fig. 8 may be manually reset or adjusted for different ranges of value of the control condition by adjusting the fulcrum pivot $C^{44}$ for the lever $C^{40}$. As shown, the pivot pin $C^{44}$ is rigidly connected to a cylindrical pivot supporting portion $C^{43}$ which is rotatively mounted in the instrument framework and has its axis parallel to, but laterally displaced from the axis of the pin $C^{44}$, and may be manually rotated, and to that end is provided with a kerf $C^{43}$ for screw driver engagement.

From the foregoing it will be clear that I have devised means for adjusting the operation of control apparatus of the type improved which are highly suitable for their intended purposes, and which may be actuated without interrupting the controlling operation of the apparatus. The capacity for precise adjustment without interruption of the control operation, is an important one in the control of many processes, in which an occasional change in the operating characteristics of the control apparatus is desirable but which are subject to serious process unbalancing or upsetting results, if the operation of control apparatus is interrupted in order to make such changes. As previously explained, the adjustments which can be made from the front of the instrument without interrupting the control, comprise the adjustment of the automatic resetting or compensating adjustment rate, throttling range, the adjustments required in effecting manual control, and in changing between automatic and manual control, and the adjustment of the control setting point. Of the foregoing adjustments, only the two first mentioned require the instrument front cover to be moved to open position. The ease and rapidity with which each of these adjustments can be made, and the accuracy with which the important automatic resetting and throttling range adjustments are measured, all contribute to the operative effectiveness of the control instrument, and are especially important because of the inter-relation of the adjustments. Usually, when any substantial change is required in either, both the automatic resetting rate and the throttling range should be adjusted. In changing between automatic and manual control, it is necessary to move the flapper element between its operative and inoperative positions, as well as to adjust the by-pass device FA, and the ease and accuracy of manual control is aided greatly by the fact that the operator can watch the pressure gauges, and particularly the pressure gauge FA[7], while adjusting the device FA.

An inherent and important advantage of the type and form of the present invention is that the ease and flexibility of adjustment provided is obtained without sacrifice of instrument compactness and general arrangement, permitting the control apparatus proper to have a very small inherent time lag, particularly as the various conduits and flow passage of the control instrument may be short, and of small volumetric capacity, though of ample flow capacity, so that the pressure changes are transmitted through those passages in a practically instantaneous manner. The pressure equalizing passages GH[5] and GH[6] may be made desirably short and direct, as a result of the fact that they are formed in the rigid structure of the control apparatus unit shown in Fig. 3. The main body portion GH of that unit may be detachably secured to the instrument casing J, as by screws GH[20], so that the unit may be bodily inserted in the casing and bodily removed therefrom for inspection, repairs, or replacement by a similar unit in better condition, or by a substitute unit having different operating characteristics or range.

The control apparatus disclosed herein embodies inventive principles disclosed and claimed in the prior application of Harrison and Side, Ser. No. 693,388, filed October 12, 1933, and the invention claimed herein comprises practically important improvements over the apparatus disclosed in said prior application. Certain novel features of construction and arrangement disclosed but not generically claimed herein, are disclosed and so claimed in Patent 2,072,921 of Robert L. Mallory, granted March 9, 1937.

While in accordance with the provisions of the statutes, I have illustrated and described the best form of embodiment of my invention now known to me, it will be apparent to those skilled in the art that change may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. In a measuring and control instrument, the combination with an instrument casing having a front cover movable to an open position to permit access to the casing interior, of mechanism within said casing comprising an exhibiting element adjacent the front of said casing, means for deflecting said element in accordance with changes in the value of a control condition, fluid pressure control mechanism including a valve adjustable to vary a control pressure, valve operating means through which the first mentioned means adjusts said valve, other valve adjusting means through which a variation in said control pressure adjusts said valve, and a rotatable device, accessible for adjustment from the front of the instrument when said cover is in its open position, for varying the operative effect of the last mentioned means on said valve.

2. An instrument as specified in claim 1, in which the said other valve adjusting means includes an expansible and contractible member and a mechanical coupling between said member and valve and in which the rotation of said adjustable device varies the operative effect of said means on said valve by adjusting said coupling.

3. In a measuring and control instrument, the combination with an instrument casing having a front cover movable to an open position to permit access to the casing interior, of mechanism within said casing comprising an exhibiting element adjacent the front of said casing, means for deflecting said element in accordance with the changes in value of a control condition and fluid pressure control mechanism including a valve adjustable to vary a control pressure, valve operating means through which the first mentioned means adjust said valve, means through which a variation in said control pressure adjusts said valve, a rotatable device accessible for adjustment from the front of the instrument when said cover is in its open position for varying the operating effect of the last mentioned means on said valve, and scaled means including a part rotated by said device and calibrated in terms relating the deflection range of said element to the variations in said control pressure produced by said deflections and accessible for inspection when said cover is in its open position.

4. In a measuring and control instrument, the combination with an instrument casing having a front cover movable to an open position to permit access to the casing interior, of mechanism within said casing comprising an exhibiting arm adjacent the front of said casing, means for deflecting said arm in accordance with changes in the value of a control condition and in a plane parallel to said cover, and fluid pressure control mechanism including a valve adjustable to vary a control pressure, means through which the first mentioned means adjusts said valve, means including a plurality of parts each movable in a plane parallel to said cover through which a variation in said control pressure adjusts said valve, and an adjustment device rotatable about an axis transverse to said plane to vary the relative positions of said parts and accessible for adjustment from the front of the instrument when said cover is in its open position.

5. In a measuring and control instrument, the combination with an instrument casing having a front cover movable to an open position to permit access to the casing interior, of mechanism within said casing comprising an exhibiting arm adjacent the front of said casing, means for deflecting said arm in accordance with changes in the value of a control condition, and fluid pressure control mechanism including a valve adjustable to vary a control pressure, means through which the first mentioned means effects a first adjustment of said valve, and means actuated by changes in said pressure for effecting a rapid second adjustment of said valve partially neutralizing the effect of said first adjustment and for effecting a delayed third adjustment in the same direction as said first adjustment, and a device adjustable to vary the rate at which said third adjustment is effected and accessible for adjustment from the front of the instrument when said cover is in its open position.

6. In a measuring and control instrument, the combination with an instrument casing having a front cover movable to an open position to permit access to the casing interior, of mechanism within said casing comprising an exhibiting recording arm adjacent the front of said casing, means for deflecting said arm in accordance with changes in the value of a control condition, fluid pressure control mechanism including a valve adjustable to vary a control pressure, means through which the first mentioned means effects a first adjustment of said valve, and means actuated by changes in said pressure for effecting a rapid second adjustment of said valve partially neutralizing the effect of said first adjustment and for effecting a delayed third adjustment in the same direction as said first adjustment, a device adjustable to vary the extent of said second adjustment, and a device adjustable to vary the rate at which said third adjustment is effected, each of said devices being accessible for adjustment from the front of the instrument when said cover is in its open position.

7. In a measuring, recording and control instrument, the combination with an instrument casing having a front cover movable to an open position to permit access to the casing interior, of mechanism within said casing comprising a recording arm adjacent the front of said casing, means for deflecting said arm in accordance with changes in the value of a control condition, means for supporting a chart in position for engagement by said recording arm, fluid pressure control mechanism including a valve adjustable to vary a control pressure, valve operating means through which the first mentioned means adjusts said valve, means through which a variation in said control pressure adjusts said valve, and a rotatable device, accessible for adjustment from the front of the instrument when said cover is moved to its open position, for varying the operative effect of the last mentioned means on said valve.

8. In a measuring, recording, and control instrument, the combination with an instrument casing having a front cover movable to an open position to permit access to the casing interior, of mechanism within said casing, comprising an exhibiting arm adjacent the front of said casing, means for deflecting said arm in accordance with changes in the value of a condition, fluid pressure control mechanism including a valve adjustable to vary a control pressure, means through which the first mentioned means adjusts said valve, and means actuated by changes in said pressure for effecting a rapid second adjustment of said valve partially neutralizing the effect of the first adjustment and for effecting a delayed third adjustment in the same direction as said first adjustment, a device adjustable to vary the extent of said second adjustment, and a device adjustable to vary the rate at which said third adjustment is effected, each of said devices being rotatable about an axis transverse to said cover when the latter is in its closed position and accessible for adjustment from the front of the instrument when said cover is in its open position.

9. In a measuring, recording, and control instrument, the combination with an instrument casing having a front cover movable to an open position to permit access to the casing interior, of mechanism within said casing comprising a recording arm adjacent the front of said casing, means for deflecting said arm in accordance with changes in the value of a control condition and in a plane parallel to said cover in the closed position of the latter, means including a shaft transverse to said plane for rotating a flexible disc chart normally parallel to said plane and engaged by said recording arm, and fluid pressure control mechanism including a valve adjustable to vary a control pressure, and including means including a plurality of parts each movable in a plane parallel to said cover through which the first mentioned means adjusts said valve, an adjustment device rotatable about an axis transverse to said plane and laterally displaced from said shaft and back of said chart in the normal position of the latter for varying the relative positions of said parts, said device being accessible for adjustment from the front of the instrument, when said cover is moved to its open position and said chart is bent forward from the plane in which it normally extends.

10. Fluid pressure control apparatus comprising a valve adjustable to vary a control pressure, means for adjusting said valve in response to variations in a control condition, and mechanism for adjusting said valve in response to variations in said control pressure comprising a longitudinally movable member, a valve adjusting lever, and a second lever and a thrust transmitting part between said levers through which said member acts on the first mentioned lever, and means for adjusting said part to vary the leverage with which the said member acts on the first mentioned lever, the last mentioned means including a rack bar member mounted for sliding movement in a direction transverse to the direction of movement of the first mentioned member, an arm carrying said part and pivotally supported by said sliding member, and a manually rotatable gear in mesh with said rack bar.

11. Fluid pressure control apparatus comprising a valve adjustable to vary a control pressure, means for adjusting said valve in response to variations in a control condition, and mechanism for adjusting said valve in response to variations in said control pressure comprising a longitudinally movable member, a valve adjusting lever, and a second lever and a thrust transmitting part between said levers through which said member acts on the first mentioned lever, and means for adjusting said part to vary the leverage with which the said member acts on the first mentioned lever, comprising a rack bar member mounted for sliding movement in a direction transverse to the direction of movement of the first mentioned member, an arm carrying said part and pivotally supported by said sliding member, a manually rotatable gear in mesh with said rack bar, said sliding member having a straight edge parallel to its direction of movement, guiding means engaging said edge and overhanging said sliding member, and means resiliently engaging said sliding member and releasably holding it in engagement with said guiding means.

12. In fluid pressure control apparatus, a source of fluid under pressure, a device including a variable pressure chamber and means responsive to the pressure in said chamber, and means for the optional automatic and manual control of the pressure in said chamber, the last mentioned means comprising a restricted outlet for the escape of pressure fluid from said chamber, a valve member normally in flow throttling relation with said outlet, means responsive to a variable control condition for varying said relation, means for rendering said valve member inoperative to throttle flow through said outlet, a port of flow capacity greater than said outlet for connecting said chamber to said source, and means including a valve member normally adjustable to variably throttle and close said port and including a flow passage more restricted than said outlet for the flow of fluid from said source to said chamber when said port is closed.

13. In fluid pressure control apparatus, a source of fluid under pressure, a device including a variable pressure space and means responsive to the pressure in said space, and means for the optional automatic and manual control of the pressure in said space, the last mentioned means comprising a restricted outlet for the escape of pressure fluid from said space, a valve member normally in flow throttling relation with said outlet but adapted to be rendered inoperative to throttle flow through said outlet, means responsive to a variable control condition for varying said relation, a connection for the flow of fluid to said space from said source, and means including a valve member manually adjustable to variably restrict said connection, whereby when said connection is given a predetermined restriction, said pressure may be automatically varied through an operative range by varying said relation, and by variably reducing said restriction, said pressure may be manually varied through said range when said outlet is unthrottled.

14. In fluid pressure control apparatus, a source of fluid under pressure, a device including a variable pressure chamber and means responsive to the pressure in said chamber, and means for the optional automatic and manual control of the pressure in said chamber, the last mentioned means comprising a restricted outlet for the escape of pressure fluid from said chamber, a valve member normally in flow throttling relation with said outlet, means responsive to a variable control condition for varying said relation, means for rendering said valve member inoperative to throttle flow through said outlet, a port of flow capacity greater than said outlet for connecting said chamber to said source, and means including a valve member manually adjustable to variably throttle and close said port and including a filter and a flow passage more restricted than said outlet through which fluid flows in series to said chamber when said port is closed.

15. In fluid pressure control apparatus, a source of fluid under pressure, a device including a variable pressure chamber and means responsive to the pressure in said chamber, and means for the optional automatic and manual control of the pressure in said chamber, the last mentioned means comprising a restricted outlet for the escape of pressure fluid from said chamber, a conduit connecting said chamber to said source and including a portion more restricted than said outlet, a valve member normally in flow throttling relation with said outlet, means responsive to a variable control condition for varying said relation, means for rendering said valve member inoperative to throttle flow through said outlet, and means including a manually adjustable valve for variably throttling and closing a by-pass about said portion for the flow of fluid from said source to said chamber.

16. Fluid pressure control apparatus comprising a valve adjustable to vary a control pressure, means for adjusting said valve in response to variations in a control condition, and mechanism for adjusting said valve in response to variations in said control pressure comprising a longitudinally movable member, a valve adjusting lever, and a second lever, and a thrust transmitting part between said levers through which said member acts on the first mentioned lever, and means for adjusting said part to vary the leverage with which the said member acts on the first mentioned part, the last mentioned means comprising an arm supporting said part, a member to which said arm is pivotally connected and provided with gear teeth, and a manually rotatable gear having teeth in mesh with the first mentioned gear teeth.

17. In fluid pressure control apparatus, a source of fluid under pressure, a device including a variable pressure chamber and means responsive to the pressure in said chamber, and means for the optional automatic and manual control of the pressure in said chamber, the last mentioned means comprising a restricted outlet for the escape of pressure fluid from said chamber, a valve member normally in flow throttling relation with said outlet, means responsive to a variable control condition for varying said relation, means for rendering said valve member inoperative to throttle flow through said outlet, a port of flow capacity greater than said outlet for connecting said chamber to said source, and means including a valve member coaxial with said port and manually adjustable in the direction of said axis to variably throttle and close said port and formed with a chamber in open communication with said source and a capillary tube in, and open at one end to said chamber and having its other end opening into said port and providing a flow passage more restricted than said outlet for the flow of fluid from said source to said chamber when said port is closed.

18. In fluid pressure control apparatus, a source of fluid under pressure, a device including a variable pressure space and means responsive to the pressure in said space, and means for controlling the pressure in said space, the last mentioned means comprising an outlet for the escape of pressure fluid from said space, a valve member in flow throttling relation with said outlet, means responsive to a variable control condition for varying said relation, and means for passing fluid from said source to said space, comprising a body formed with a passage communicating with said space and with a passage communicating with said source and with a plug socket communicating with each passage, and a plug enclosing a chamber and adapted to be inserted in said socket and prevent direct communication between said passages, and a fine bore tube mounted in said plug and open at one end to said chamber and open at its other end to one of said passages, said plug being formed with an inlet to said chamber through which the latter communicates with the other of said passages.

19. In fluid pressure control apparatus, a source of fluid under pressure, a device including a variable pressure space and means responsive to the pressure in said space, and means for controlling the pressure in said space, the last mentioned means comprising an outlet for the escape of pressure fluid from said space, a valve member in flow throttling relation with said outlet, means responsive to a variable control condition for varying said relation, and means for passing fluid from said source to said space, comprising a body formed with a passage communicating with said space and with a passage communicating with said source and with a plug socket communicating with each passage, and a plug enclosing a chamber and adapted to be inserted in said socket and prevent direct communication between said passages, a fine bore tube mounted in said plug and open at one end to said chamber and open at its other end to one of said passages, said plug being formed with an inlet to said chamber through which the latter communicates with the other of said passages, and a filter in said plug chamber interposed between said inlet and the end of said tube opening to the plug chamber.

20. Fluid pressure control apparatus comprising a valve adjustable to vary a control pressure, means for adjusting said valve in response to variations in a control condition, and mechanism for adjusting said valve in response to variations in said control pressure comprising a longitudinally movable member, an adjustable eccentric pin carried by said member, a valve adjusting lever, a second lever engaged by said pin, and a thrust transmitting part between said levers.

21. Fluid pressure control apparatus comprising a valve adjustable to vary a control pressure, means for adjusting said valve in response to variations in a control condition, and mechanism for adjusting said valve in response to variations in said control pressure comprising a longitudinally movable member, a valve adjusting lever, and a second lever and a thrust transmitting part between said lever through which said member acts on the first mentioned lever, and means for adjusting said part to vary the leverage with which the said member acts on the first mentioned lever, comprising a member mounted for sliding movement in a direction transverse to the direction of movement of the first mentioned member, and an arm carrying said part and pivotally supported by said sliding member.

22. In a measuring and control instrument, the combination with an instrument casing having a front cover movable to an open position to permit access to the casing interior, of mechanism within said casing comprising a control pressure space, a valve adjustable to vary the escape of air from said space and thereby vary the pressure in said space, a casing structure adjacent but external to said chamber, and a unitary pilot valve mechanism mounted in said structure and comprising a pressure chamber communicating with said space, a second pressure chamber, and means for automatically maintaining a pressure in said second chamber proportional to the pressure in the first mentioned chamber, a pressure gauge mounted on said structure and indicating the pressure in said second chamber, a passage in said structure forming a portion of a flow path from said source to said space and manually adjustable means mounted in said structure for variably restricting said flow passage, whereby when said flow passage is given a predetermined restriction, the pressure in said space may be controlled by said valve, and said pressure may be manually controlled by variably reducing said restriction, and whereby the effect of said manual adjustment on the pressure in said second chamber may be determined through said gauge as manual adjustment is effected.

23. In a measuring and control instrument, the combination with an instrument casing having a mechanism chamber and a front cover movable to an open position to permit access to said chamber, of mechanism within said chamber, comprising an element deflecting in accordance with changes in the value of a control condition, fluid pressure control mechanism including a valve adjustable to vary a control pressure, valve operating means through which the deflection of said element adjusts said valve, other valve adjusting means through which a variation in said control pressure adjusts said valve, a rotary member, and a mechanical connection between said operating means and rotary member through which the rotation of the latter may vary the control pressure which said deflecting element tends to maintain when in a given position, and a rotatable part mounted in said cover and operatively engaging said rotary member when the cover is in its closed position, so that said rotary member may then be rotated.

24. In a measuring and control instrument, the combination with an instrument casing having a mechanism chamber and a front cover movable to an open position to permit access to said chamber, of mechanism within said chamber, comprising an element deflecting in accordance with changes in the value of a control condition, fluid pressure control mechanism including a valve adjustable to vary a control pressure, valve operating means through which the deflection of said element adjusts said valve, other valve adjusting means through which a variation in said control pressure adjusts said valve, a rotary member, and a mechanical connection between said operating means and rotary member through which the rotation of the latter may render said valve inoperative to control said pressure, a rotatable part mounted in said cover and operatively engaging said rotary member when said cover is in its closed position, so that said rotary member may then be rotated, and manually adjustable means adjacent but external to said chamber for regulating said control pressure when said valve is rendered inoperative.

25. In a measuring and control instrument, the combination with an instrument casing of mechanism within said casing, comprising an element deflecting in accordance with changes in the value of a control condition, and a fluid pressure control unit mounted in said casing and comprising a supporting structure, and parts mounted therein including a nozzle, a movable flapper valve element controlling flow through said nozzle, a flapper operating lever, a second lever providing a movable fulcrum for the first mentioned lever, a plurality of expansible and contractible pressure chambers having movable walls, one of said chambers being connected to said nozzle for regulation of the pressure therein by the adjustment of said flapper, a regulable pressure equalizing connection between two of said chambers comprising passages formed in said structure, and a member rigidly connecting the movable walls of two of said chambers and moving in response to a resultant effect of pressure variations in the different chambers, and means through which the movements of said member adjust said fulcrum lever.

26. In a measuring and control instrument, the combination with an instrument casing of mechanism within said casing, comprising an element deflecting in accordance with changes in the value of a control condition, and a fluid pressure control unit mounted in said casing and comprising a supporting structure and parts mounted therein including a nozzle, a movable flapper valve element controlling flow through said nozzle, a flapper operating lever, a second lever providing a movable fulcrum for the first mentioned lever, a plurality of expansible and contractible pressure chambers having movable walls one of said chambers being connected to said nozzle for regulation of the pressure therein by the adjustment of said flapper, a regulable pressure equalizing connection between two of said chambers comprising passages formed in said structure, and a member rigidly connecting the movable walls of two of said chambers and moving in response to a resultant effect of pressure variations in the different chambers, and means through which the movements of said member adjust said fulcrum lever and an operating connection from said deflecting element adapted for optional connection to the first mentioned lever at one side or at the opposite side of said fulcrum.

27. In a measuring and control instrument, the combination with an instrument casing, of mechanism within said casing comprising an exhibiting element adjacent the front of said casing, means for deflecting said element in accordance with changes in the value of a control condition, fluid pressure control mechanism including a valve adjustable to vary a control pressure, valve operating means through which the first mentioned means adjusts said valve, other valve adjusting means through which a variation in said control pressure adjusts said valve, and a rotatable device, accessible for adjustment from the front of the instrument for varying the operative effect of the last mentioned means on said valve.

28. In a measuring and control instrument, the combination with an instrument casing having a front cover movable to an open position to permit access to the casing interior, of mechanism within said casing comprising an exhibiting element adjacent the front of said casing, means for deflecting said element in accordance with changes in the value of a control condition, fluid pressure control mechanism including a valve adjustable to vary a control pressure, valve operating means through which the first mentioned means adjusts said valve, other valve adjusting means through which a variation in said control pressure adjusts said valve, and a rotatable adjustment device, accessible for adjustment from the front of the instrument when said cover is in its open position, for varying the operative effect of the last mentioned means on said valve, said instrument including means normally covering said adjusting device and preventing its adjustment but movable to uncover the latter.

29. In a measuring and control instrument, the combination with an instrument casing having a front cover movable to an open position to permit access to the casing interior, of mechanism within said casing comprising an exhibiting element adjacent the front of said casing means for deflecting said element in accordance with changes in the value of a control condition, fluid pressure control mechanism including a valve adjustable to vary a control pressure, valve operating means through which the first mentioned means adjusts said valve, other valve adjusting means through which a variation in said control pressure adjusts said valve, and a rotatable adjustment device, accessible for adjustment from the front of the instrument when said cover is in its open position, for varying the operative effect of the last mentioned means on said valve, said instrument including means normally covering said adjusting means and preventing its adjustment but movable to uncover the latter, said cover preventing uncovering movement of said means when in its closed position and permitting such movement when in its open position.

30. In an air actuated instrument, the combination with an element deflecting in accordance with changes in the value of a control condition, of a link having a pivotal connection at one end with said element, a lever adapted to deflect about a pivot displaced from said pivotal connection and having an actuating portion and two actuated portions, said actuated portions being disposed at opposite sides of a line connecting the axes of said pivot and pivotal connection, an air valve controlled by said actuating portion, and means for optionally connecting the end of said link remote from said pivotal connection to either of said actuated lever portions, whereby deflection of said element in a given direction turns said lever about said pivot in one direction or the other accordingly as said link is connected to one or the other of said actuated portions.

31. In a measuring and control instrument, the combination with an instrument casing, of mechanism within said casing comprising an element deflectable in accordance with changes in the value of a control condition, fluid pressure control mechanism including a valve adjustable to vary a control pressure, valve operating means through which said element adjusts said valve, a second valve operating means through which a variation in said control pressure adjusts said valve first in one sense and then in the opposite sense, a condition regulator responsive to said control pressure, a device rotatable about an axis fixed with respect to said casing for adjusting said second valve operating means to modify its adjustment of said valve in said one sense, a second device rotatable about an axis fixed with respect to said casing for adjusting said second valve operating means to modify its adjustment of said valve in said opposite sense, a third device rotatable about an axis fixed with respect to said casing for varying said control pressure independently of the deflective position of said element, and a fourth device rotatable about an axis fixed with respect to said casing for varying the relation between the value of said condition and the adjustment of said valve by said element.

32. In a measuring control instrument, the combination with an instrument casing, of mechanism within said casing comprising an element deflectable in accordance with changes in the value of a control condition, fluid pressure control mechanism including a valve adjustable to vary a control pressure, valve operating means through which said element adjusts said valve, a second valve operating means through which a variation in said control pressure adjusts said valve, a condition regulator responsive to said control pressure, a device rotatable about an axis fixed with respect to said casing for varying the extent of valve adjustment produced by a given deflection of said element, a second device rotatable about an axis fixed with respect to said casing for adjusting said second valve operating means to modify its adjustment of said valve, a third device rotatable about an axis fixed with respect to said casing for varying said control pressure independently of the deflective position of said element, and a fourth device rotatable about an axis fixed with respect to said casing for varying the relation between the value of said condition and the adjustment of said valve by said element.

33. In a measuring and control instrument, the combination with an instrument casing, of mechanism within said casing comprising an element adjusted in accordance with the value of the control condition, fluid pressure control mechanism including a valve adjustable to vary a control pressure, valve operating means by which the first mentioned means adjusts said valve including a pivoted valve adjusting lever operatively associated with said element, a second lever, and means for adjusting the ratio of the movement of said deflecting element to the movement of said second mentioned lever including a slidable abutment forming the actuating connection between said levers and means rotatable about a fixed axis for adjusting said abutment.

34. In a measuring and control instrument, the combination with an instrument casing, of mechanism within said casing comprising an element adjusted in accordance with changes in the value of control condition, fluid pressure control mechanism including a valve adjustable to vary a control pressure, valve operating means through which the first mentioned means adjusts said valve, other valve adjusting means through which a variation in said control pressure adjusts said valve, a first device rotatable about an axis fixed with respect to said casing for adjusting the extent of valve adjustment produced by a given adjustment of said element, and a second device rotatable about an axis fixed with respect to said casing, through which the extent of adjustment of the valve effected by the control pressure responsive means on a given change in the control pressure is adjusted.

35. In a measuring and control instrument, the combination with an instrument casing, of mechanism within said casing comprising an element deflectable in accordance with changes in the value of a control condition, fluid pressure control mechanism including a valve adjustable to vary a control pressure, valve operating means through which said element adjusts said valve, a second valve operating means through which a variation in said control pressure adjusts said valve first in one sense and then in the opposite sense, a condition regulator responsive to said control pressure, a device rotatable about an axis fixed with respect to said casing for adjusting said second valve operating means to modify its adjustment of said valve in said one sense, a second device rotatable about an axis fixed with respect to said casing for adjusting said second valve operating means to modify its adjustment of said valve in said opposite sense, a third device rotatable about an axis fixed with respect to said casing for varying said control pressure independently of the deflective position of said element, a fourth device rotatable about an axis fixed with respect to said casing for varying the relation between the value of said condition and the adjustment of said valve by said element, and a fifth device for adjusting the said control pressure independently of the other adjustment devices.

36. In a measuring and control instrument, the combination with an instrument casing, of mechanism within said casing comprising an element adjusted in accordance with changes in the value of control condition, fluid pressure control mechanism including a valve adjustable to vary a control pressure, valve operating means through which the first mentioned means adjusts said valve, means responsive to the control pressure for further adjusting said valve, a first rotatable device for adjusting the extent of valve adjustment produced by a given adjustment of said element, and a second device rotatable about an axis fixed with respect to said casing, through which the extent of adjustment of the valve effected by the control pressure responsive means on a given change in the control pressure is adjusted.

37. In a measuring and control instrument, the combination with a supporting structure, of mechanism comprising an element adjusted in accordance with changes in the value of the control condition, control mechanism including a pair of cooperating control members adjustable to effect a control action, operating means through which the adjustment of said element adjusts the relation of said members, follow up means actuated proportionally to the adjustment of the member relation by said element, reset means actuated on a departure of said condition from normal and tending to eliminate the effect of the follow up means, a device rotatable about an axis fixed with respect to said structure for adjusting the ratio of the element adjustment to said follow up adjustment, a device rotatable about an axis fixed with respect to said structure for adjusting the rate of said reset adjustment, and a device rotatable about an axis fixed with respect to said structure for effecting a control action independently of the relation of said control members.

COLEMAN B. MOORE.